(12) United States Patent
Rao et al.

(10) Patent No.: US 11,366,211 B2
(45) Date of Patent: *Jun. 21, 2022

(54) MAXIMUM MEASURABLE VELOCITY IN FREQUENCY MODULATED CONTINUOUS WAVE (FMCW) RADAR

(71) Applicant: Texas Instruments Incorporated, Dallas, TX (US)

(72) Inventors: Sandeep Rao, Bangalore (IN); Karthik Subburaj, Bangalore (IN); Sriram Murali, Bangalore (IN); Karthik Ramasubramanian, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/984,246

(22) Filed: Aug. 4, 2020

(65) Prior Publication Data

US 2020/0363518 A1 Nov. 19, 2020

Related U.S. Application Data

(63) Continuation of application No. 15/665,663, filed on Aug. 1, 2017, now Pat. No. 10,775,489.

(30) Foreign Application Priority Data

Dec. 15, 2016 (IN) .............. 201641042728

(51) Int. Cl.
*G01S 13/28* (2006.01)
*G06F 17/14* (2006.01)
(Continued)

(52) U.S. Cl.
CPC ............ *G01S 13/282* (2013.01); *G01S 7/354* (2013.01); *G01S 7/415* (2013.01); *G01S 13/343* (2013.01);
(Continued)

(58) Field of Classification Search
CPC ........ G01S 13/282; G01S 7/354; G01S 7/415; G01S 13/343; G01S 13/536;
(Continued)

(56) References Cited

U.S. PATENT DOCUMENTS 3,261,918 A * 7/1966 Sisti .................. H04J 3/14
370/506
3,261,921 A * 7/1966 Sahir ................ H04J 3/12
370/510
(Continued)

FOREIGN PATENT DOCUMENTS

DE 102015122706 A1 * 6/2016 .......... G01S 13/003
DE 102015122706 A1 6/2016
(Continued)

OTHER PUBLICATIONS

DE102015122706—English Specification, dated Sep. 23, 2019, 21 pages.
(Continued)

*Primary Examiner* — Bernarr E Gregory
*Assistant Examiner* — Nuzhat Pervin
(74) *Attorney, Agent, or Firm* — Carl Peterson; Charles A. Brill; Frank D. Cimino

(57) ABSTRACT

A radar system is provided that includes a radar transceiver integrated circuit (IC) configurable to transmit a first frame of chirps, and another radar transceiver IC configurable to transmit a second frame of chirps at a time delay $\Delta T$, wherein $\Delta T=T_c/K$, $K \geq 2$ and $T_c$ is an elapsed time from a start of one chirp in the first frame and the second frame and a start of a next chirp in the first frame and the second frame, wherein the radar system is configured to determine a velocity of an object in a field of view of the radar system based on first digital intermediate frequency signals generated responsive to receiving reflected chirps of the first
(Continued)

frame and second digital IF signals generated responsive to receiving reflected chirps of the time delayed second frame, wherein the maximum measurable velocity is increased by a factor of K.

16 Claims, 8 Drawing Sheets

(51) Int. Cl.
| | |
|---|---|
| *G01S 7/41* | (2006.01) |
| *G01S 13/536* | (2006.01) |
| *G01S 13/931* | (2020.01) |
| *G01S 13/34* | (2006.01) |
| *G01S 7/35* | (2006.01) |
| *G06F 17/13* | (2006.01) |
| *H04N 5/232* | (2006.01) |

(52) U.S. Cl.
 CPC .......... *G01S 13/536* (2013.01); *G01S 13/931* (2013.01); *G06F 17/142* (2013.01); *G01S 7/356* (2021.05); *G06F 17/13* (2013.01); *H04N 5/23296* (2013.01)

(58) Field of Classification Search
 CPC ............. G01S 13/931; G01S 2007/356; G06F 17/142; G06F 17/13; H04N 5/23296
 USPC ......................................................... 342/201
 See application file for complete search history.

(56) References Cited

U.S. PATENT DOCUMENTS

| | | | | |
|---|---|---|---|---|
| 3,369,229 | A * | 2/1968 | Dorros | H03M 1/00 |
| | | | | 341/56 |
| 4,613,863 | A * | 9/1986 | Mitchell | G01S 7/38 |
| | | | | 342/14 |
| 5,014,271 | A * | 5/1991 | Fujimoto | H04J 3/076 |
| | | | | 375/372 |
| 5,525,996 | A * | 6/1996 | Aker | G01S 13/92 |
| | | | | 342/104 |
| 5,691,724 | A * | 11/1997 | Aker | G01S 7/032 |
| | | | | 342/115 |
| 6,317,073 | B1 * | 11/2001 | Tamatsu | G01S 13/44 |
| | | | | 342/128 |
| 7,345,619 | B2 * | 3/2008 | Hunt | G01S 7/35 |
| | | | | 327/107 |
| 7,400,290 | B2 * | 7/2008 | Woodington | G01S 7/414 |
| | | | | 342/107 |
| 7,420,502 | B2 * | 9/2008 | Hartzstein | H01Q 19/17 |
| | | | | 342/72 |
| 8,169,311 | B1 * | 5/2012 | Breed | B60R 21/01536 |
| | | | | 340/539.22 |
| 9,599,702 | B1 * | 3/2017 | Bordes | G01S 7/354 |
| 9,753,121 | B1 * | 9/2017 | Davis | G01S 13/18 |
| 10,274,594 | B2 * | 4/2019 | Pokrass | G01S 13/343 |
| 10,775,489 | B2 * | 9/2020 | Rao | G06F 17/142 |
| 2007/0025420 | A1 * | 2/2007 | Dong | H04L 25/03834 |
| | | | | 375/130 |
| 2007/0152870 | A1 * | 7/2007 | Woodington | G01S 13/528 |
| | | | | 342/72 |
| 2008/0129546 | A1 * | 6/2008 | Manor | G08G 1/04 |
| | | | | 340/936 |
| 2008/0153433 | A1 * | 6/2008 | Pallonen | H03F 3/211 |
| | | | | 370/282 |
| 2008/0231498 | A1 * | 9/2008 | Menzer | G01S 13/765 |
| | | | | 342/134 |
| 2010/0271092 | A1 * | 10/2010 | Zerbe | G06F 1/04 |
| | | | | 327/161 |
| 2010/0321234 | A1 * | 12/2010 | Goldman | G01S 13/9029 |
| | | | | 342/25 A |
| 2011/0006944 | A1 * | 1/2011 | Goldman | G01S 13/9054 |
| | | | | 342/25 A |
| 2011/0287778 | A1 * | 11/2011 | Levin | H04W 4/029 |
| | | | | 342/461 |
| 2012/0235855 | A1 * | 9/2012 | Kurtz | G01S 13/584 |
| | | | | 342/128 |
| 2013/0234880 | A1 * | 9/2013 | Lee | G01S 13/931 |
| | | | | 342/70 |
| 2014/0035781 | A1 * | 2/2014 | Holzheimer | H01Q 21/24 |
| | | | | 342/385 |
| 2015/0153445 | A1 * | 6/2015 | Jansen | G01S 13/003 |
| | | | | 342/195 |
| 2015/0285904 | A1 * | 10/2015 | Rao | G01S 13/06 |
| | | | | 342/146 |
| 2015/0339257 | A1 * | 11/2015 | Hug | G06F 1/12 |
| | | | | 710/110 |
| 2015/0362580 | A1 * | 12/2015 | Ha | G01S 3/74 |
| | | | | 342/417 |
| 2016/0054437 | A1 * | 2/2016 | Lilburn | G01S 13/28 |
| | | | | 342/21 |
| 2017/0371030 | A1 * | 12/2017 | Pokrass | G01S 13/0209 |
| 2018/0156911 | A1 * | 6/2018 | Pokrass | G01S 13/931 |
| 2018/0267164 | A1 * | 9/2018 | Schwert | G01S 13/342 |

FOREIGN PATENT DOCUMENTS

| | | | | |
|---|---|---|---|---|
| EP | | 1806598 A1 * | 7/2007 | .......... G01S 13/528 |
| EP | | 1806598 A1 | 7/2007 | |
| KR | 201 60077006 A | | 7/2016 | |
| KR | 20160077006 A * | | 7/2016 | ............. G01S 13/87 |

OTHER PUBLICATIONS

DE102015122706—English Claims, dated Sep. 23, 2019. 2 pages.
KR20160077006—English Abstract, dated Jan. 27, 2020, 2 pages.

\* cited by examiner

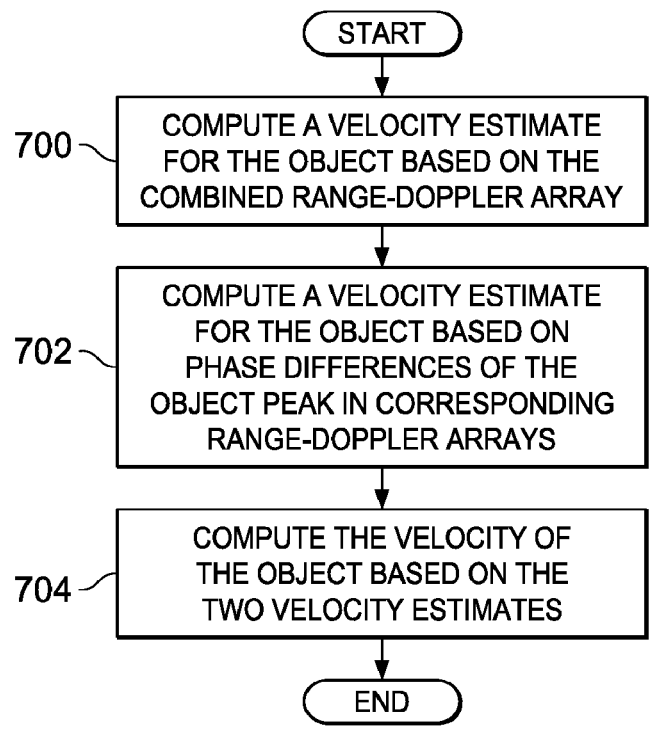
FIG. 7
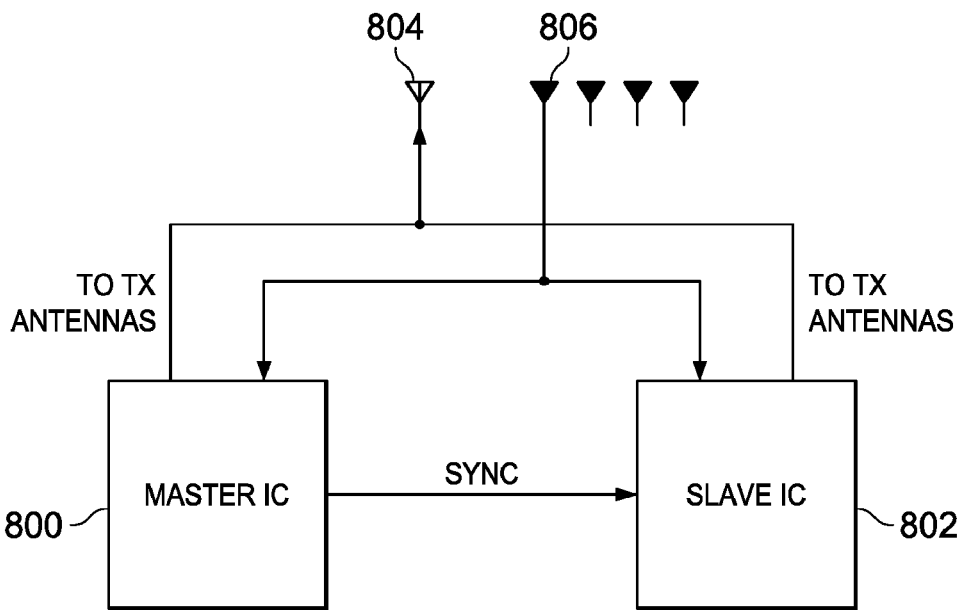
FIG. 8
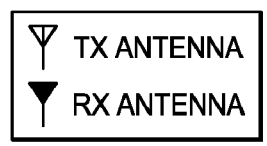

MAXIMUM MEASURABLE VELOCITY IN FREQUENCY MODULATED CONTINUOUS WAVE (FMCW) RADAR

CROSS-REFERENCE TO RELATED APPLICATIONS

This application is a continuation of U.S. patent application Ser. No. 15/665,663, filed Aug. 1, 2017, and claims benefit of India Provisional Patent Application Serial No. 201641042728, filed Dec. 15, 2016, both of which are incorporated herein by reference in their entirety.

BACKGROUND OF THE DISCLOSURE

Field of the Disclosure

Embodiments of the present disclosure generally relate to frequency modulated continuous wave (FMCW) radar systems, and more specifically relate to improving the maximum measurable velocity in an FMCW radar system.

Description of the Related Art

The use of embedded frequency modulated continuous wave (FMCW) radar systems in industrial and automotive applications is evolving rapidly. For example, embedded FMCW radar systems may be used in a number of applications associated with a vehicle such as adaptive cruise control, collision warning, blind spot warning, lane change assist, parking assist and rear collision warning. Further, embedded FMCW radar systems may be used in industrial or security applications such as tracking movement inside a house or building under surveillance and maneuvering a robot in a factory or warehouse.

An FMCW radar transmits a series of equally spaced frequency ramps, also referred to as chirps, in a unit referred to as a frame. The reflected signal is down-converted, digitized and processed to estimate the range, velocity and angle of arrival of objects in front of the radar. The maximum unambiguous velocity that can be measured is a key care-about in such a radar system as the estimation of the velocity of objects moving at a velocity greater than the maximum measurable velocity may be erroneous in both magnitude and sign. For example, for a radar with a maximum measurable velocity of 70 kilometers per hour (kmph), the relative velocity of an object moving at 75 kmph may be estimated as a velocity of −5 kmph.

SUMMARY

Embodiments of the present disclosure relate to methods and apparatus for improving the maximum measurable velocity in a frequency modulated continuous wave (FMCW) radar system. In one aspect, radar system having a maximum measurable velocity $v_{max}$ is provided that includes a first radar transceiver integrated circuit (IC) configurable to transmit a first frame of chirps, and a second radar transceiver IC configurable to transmit a second frame of chirps at a time delay $\Delta T$ from when the first radar transceiver IC begins transmitting the first frame of chirps, wherein $\Delta T=T_c/K$, $K \geq 2$ and $T_c$ is an elapsed time from a start of one chirp in the first frame of chirps and the second frame of chirps and a start of a next chirp in the first frame and the second frame, wherein the radar system is configured to determine a velocity of an object in a field of view (FOV) of the radar system based on first digital intermediate frequency (IF) signals generated by the first radar transceiver IC responsive to receiving reflected chirps of the first frame of chirps and second digital IF signals generated by the second radar transceiver IC responsive to receiving reflected chirps of the time delayed second frame of chirps, wherein $v_{max}$ is increased by a factor of K.

In one aspect, a method for determining velocity of objects in a radar system having a maximum measurable velocity $v_{max}$ is provided that includes initiating transmission of a first frame of chirps by a first radar transceiver integrated circuit (IC) in the radar system, initiating transmission of a second frame of chirps by a second radar transceiver IC in the radar system at a time delay $\Delta T$ from when the first radar transceiver IC begins transmitting the frame of chirps, wherein $\Delta T=T_c/K$, $K\geq 2$ and $T_c$ is an elapsed time from a start of one chirp in the first frame of chirps and the second frame and a start of a next chirp in the first frame and the second frame, generating first digital intermediate frequency (IF) signals by the first radar transceiver IC responsive to receiving reflected chirps of the first frame of chirps, generating second digital IF signals by the second radar transceiver IC responsive to receiving reflected chirps of the time delayed second frame of chirps, and determining a velocity of an object in a field of view (FOV) of the radar system based on the first digital IF signals and the second digital IF signals, wherein $v_{max}$ is increased by a factor of K.

BRIEF DESCRIPTION OF THE DRAWINGS

Particular embodiments will now be described, by way of example only, and with reference to the accompanying drawings:

FIG. 7 is a flow diagram of a method for determining the velocity of an object;

FIG. 8 is an example illustrating transmit and receive antenna routing between two radar transceiver integrated circuits;

DETAILED DESCRIPTION OF EMBODIMENTS OF THE DISCLOSURE

Figure 1A:
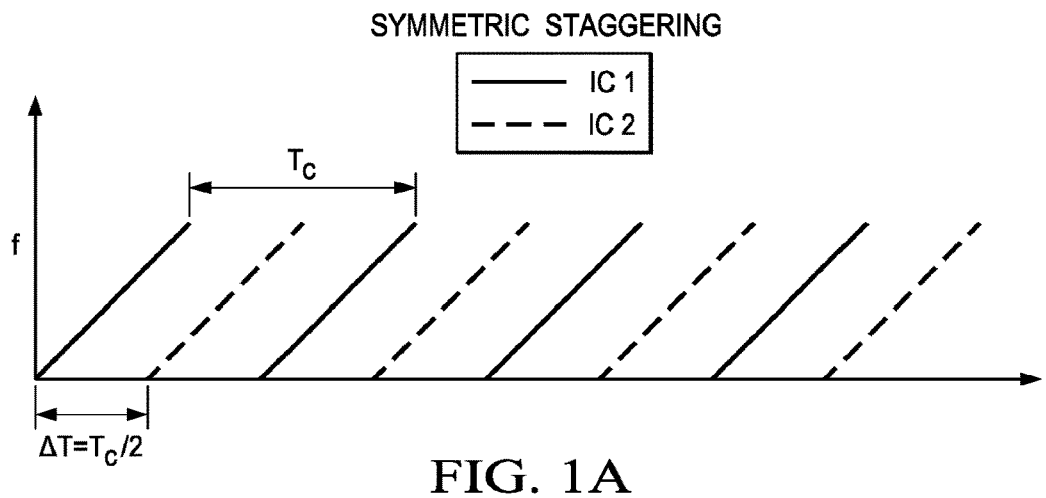
FIGS. 1A and 1B are examples illustrated staggered chirp transmission.

Specific embodiments of the disclosure will now be described in detail with reference to the accompanying figures. Like elements in the various figures are denoted by like reference numerals for consistency.

In a typical frequency modulated continuous wave (FMCW) radar system, consecutive sequences of equally spaced chirps are transmitted and received to generate radar signals. After each consecutive sequence of chirps, there is some idle time (inter-frame idle) to allow for processing the resulting radar signals. The acquisition time of a sequence of chirps and the subsequent inter-frame idle time form a radar frame. The reflected signal from each antenna is mixed with the transmitted signal to generate an intermediate frequency (IF) signal that is filtered and digitized. Signal processing is then performed on the resulting digital IF signals (one per receiving antenna in the system) to extract the range, velocity, and angle of potential objects in the view of the radar.

The signal processing may be performed as follows. For each receive channel, a range Fast Fourier Transform (FFT) is performed on the digitized samples of each reflected chirp to convert the data to the frequency domain. Peak values in the resulting array correspond to ranges (distances) of potential objects. The results of the range FFTs are saved in memory for further processing. There will be one set of range FFT results, i.e., one range array, for each receive antenna. Note that if there are N time samples in a chirp, N range results each corresponding to a specific range bin are stored for the chirp. Thus, logically, if there are M chirps in the chirp sequence, arrays of M×N range values are generated by the range FFTs. In these arrays, the N columns are the signal values for the corresponding range bins across the M chirps.

For each range array, a Doppler FFT is performed over each of the corresponding range values of the chirps in the chirp sequence. That is, a Doppler FFT is performed on each of the N columns of the M×N array. The peaks in the resulting M×N range-Doppler plane, also referred to as a range-Doppler array or range-Doppler slice, correspond to the range and relative speed (velocity) of potential objects. There will be a range-Doppler array for each receive antenna.

Coherent integration may then be performed across the range-Doppler arrays to determine angle information of the potential objects. When multiple receivers each connected to a receive antenna are used, the reflected signals will each have a different delay depending on the angle of an object reflecting the signal. For coherent integration, a third FFT, i.e., an angle FFT, is performed across the range-Doppler arrays for each antenna. Potential objects are detected by considering peaks in the range-Doppler-angle cubes. The information regarding the potential objects may then used for application specific processing such as object tracking, rate of movement of objects, direction of movement, etc. In the automotive context, the object data may be used, for example, for lane change assistance, parking, blind spot detection, rear collision alert, emergency braking, and cruise control.

As previously mentioned, the maximum unambiguous velocity $v_{max}$ that can be measured is a key care-about in a frequency modulated continuous wave (FMCW) radar system. Velocity is estimated by measuring the phase difference across consecutive received chirps. Thus, a large chirp periodicity $T_c$, i.e., the elapsed time from the start of one chirp to the start of the next chirp, can result in a phase rollover which causes errors in the estimated velocity. The achievable $v_{max}$ is inversely proportional to $T_c$, i.e., is given by $v_{max}=\lambda/(4T_c)$, where $\lambda$ is the wavelength corresponding to the starting frequency of a chirp. However, various factors limit the minimum achievable $T_c$, and thus limit the maximum measurable $v_{max}$. These factors include the bandwidth spanned by a chirp, the slope of the chirp, and, in some FMCW radar configurations, multiple transmitters transmitting in sequence.

The bandwidth of a chirp affects range resolution, i.e., the larger the bandwidth, the better the range resolution. However, increasing the chirp bandwidth to improve range resolution increases $T_c$. The maximum slope of a chirp is limited by the bandwidth of the chirp generation circuitry, the IF bandwidth of the receive channels, and the maximum distance supported by the radar. As chirp slope decreases, $T_c$ increases for a given bandwidth spanned by the chirp. If the FMCW radar provides a time division multiplexed multiple input multiple output (TDM-MIMO) mode of operation which improves angle resolution, multiple transmitters transmit in sequence, which increases the effective $T_c$. In the context of TDM-MIMO, $T_c$ is defined as the elapsed time from the start of one chirp to the start of the next chirp from the same transmitter.

Figure 1B:
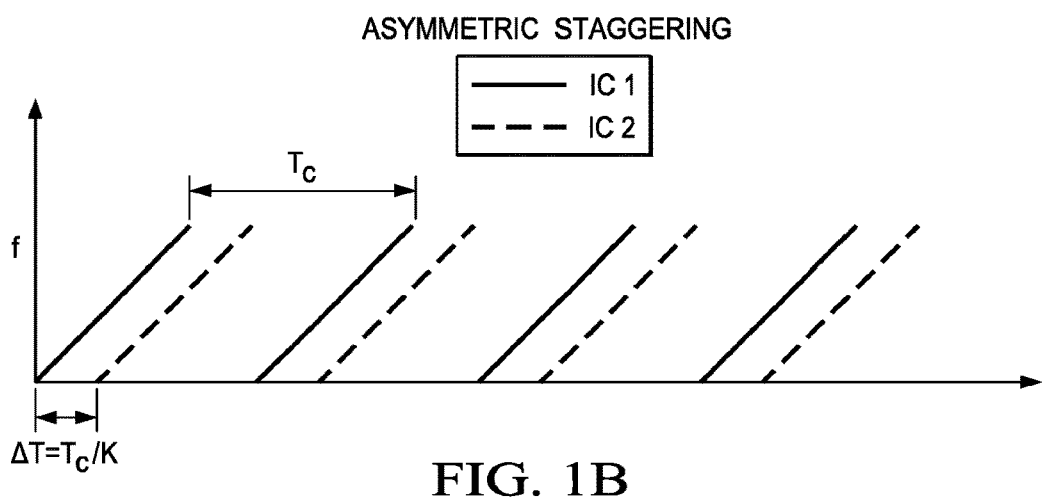

Embodiments of the disclosure provide for increasing the maximum measurable $v_{max}$ of an FMCW radar system. In some embodiments, chirps in frames generated by two radar transceiver integrated circuits (ICs) in a radar system are transmitted such that there is a time delay $\Delta T$ between when one master radar transceiver IC begins transmission and when the other radar transceiver IC begins transmission, i.e., the transmitted chirps from the two radar transceiver ICs are interleaved or staggered by $\Delta T$, where $\Delta T=T_c/K$, $K\geq 2$. The staggered transmission decreases the effective $T_c$ by a factor of K, thus improving $v_{max}$ by a factor of K. As illustrated in FIG. 1A for two ICs, when K=2, the staggering of the transmitted chirps is symmetrical, i.e., the space between all adjacent chirps is the same. As illustrated in FIG. 1B, when K>2, the staggering of the transmitted chirps is asymmetrical. In some such embodiments, the radar system is configured to switch between two modes of operation: a mode favoring increased angle resolution and a mode favoring increased $v_{max}$.

Figure 2:
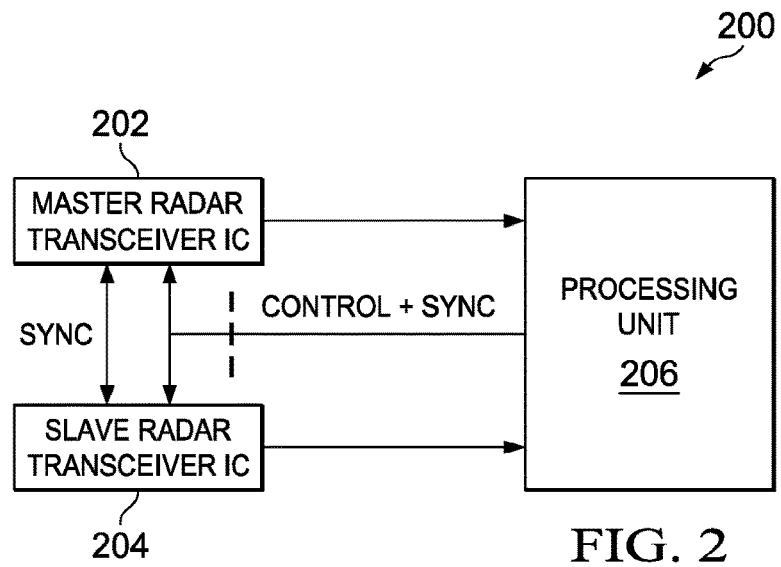
FIGS. 2 and 3 are block diagrams of an example frequency modulated continuous wave (FMCW) radar system.
Figure 3:
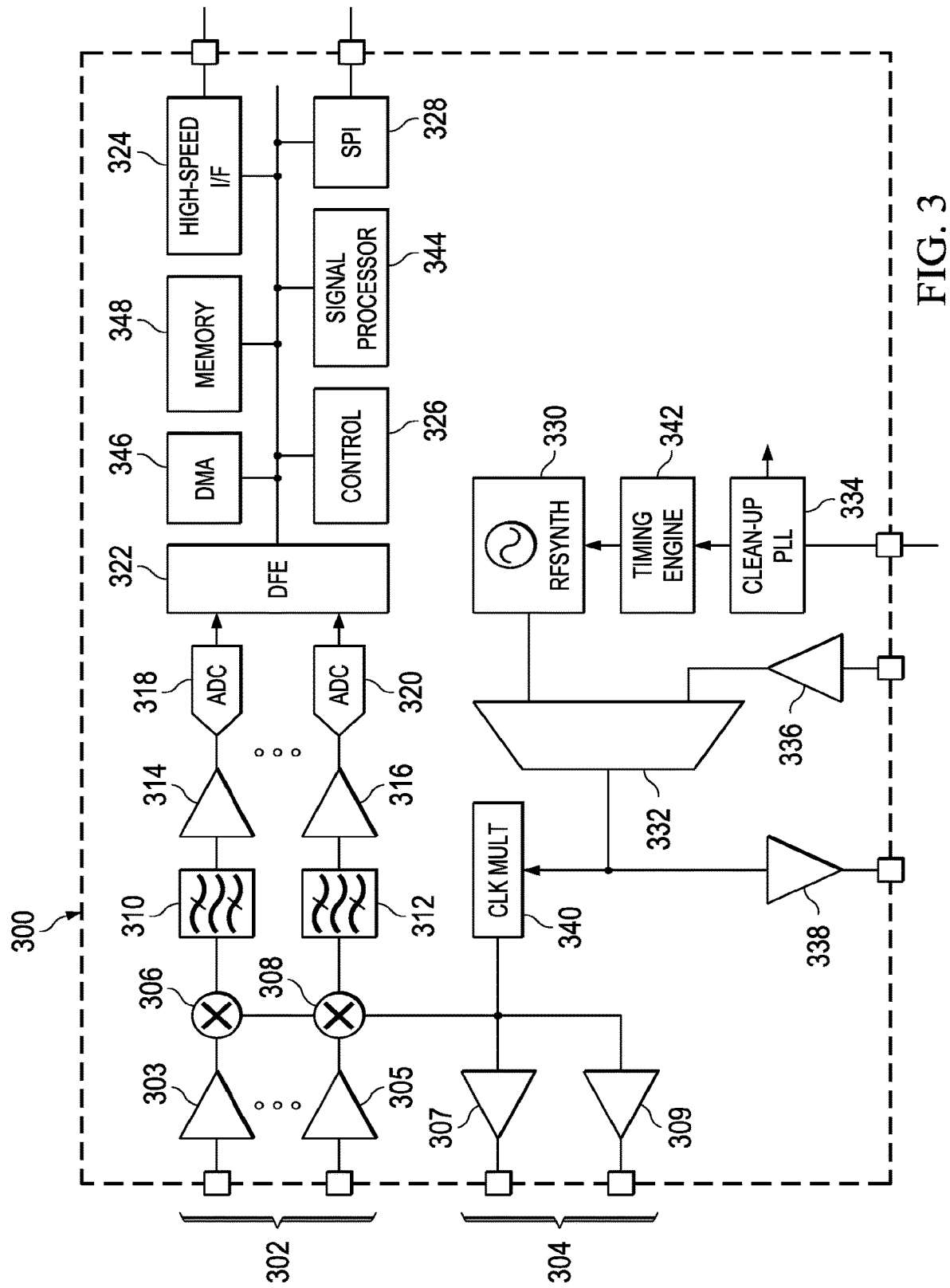

FIGS. 2 and 3 are block diagrams of an example FMCW radar system 200 configured to increase the maximum measurable velocity. FIG. 2 illustrates the top level architecture of the radar system 200 and FIG. 3 illustrates an example FMCW radar transceiver integrated circuit (IC) suitable for use in the radar system 200.

Referring first to FIG. 2, the example FMCW radar system 200 illustrated is suitable for use in an embedded application. The radar system 200 includes a master radar transceiver integrated circuit (IC) 202, a slave radar transceiver IC 204, and a processing unit 206. The master radar transceiver IC 202 and the slave radar transceiver IC 204 each have the architecture of the example FMCW radar transceiver IC of FIG. 3. Further, the master radar transceiver IC 202 is coupled to the slave radar transceiver IC 204 to allow for synchronization of the operation of the slave radar transceiver IC 204 with that of the master radar transceiver IC 202. The master radar transceiver IC 202 and the slave radar transceiver IC 204 may be referred to collectively herein as the radar system front end or the front end.

The processing unit 206 is coupled to the master radar transceiver IC 202 and the slave radar transceiver IC 204 via a serial interface to receive data from the radar transceiver ICs. In some embodiments, the serial interface may be a high speed serial interface such as a low-voltage differential signaling (LVDS) interface. In some embodiments, the serial interface may be lower speed serial peripheral interface (SPI). As is explained in more detail in reference to FIG. 3, each radar transceiver IC 202, 204 includes functionality to generate multiple digital intermediate frequency (IF) signals (alternatively referred to as dechirped signals, beat signals, or raw radar signals) from reflected chirps. Further, each radar transceiver IC 202, 204 may include functionality to perform part of the signal processing of radar signals received in the IC, and to provide the results of this signal processing to the processing unit 206 via the serial interface. In some embodiments, each radar transceiver IC 202, 204 performs the range FFT for each radar frame. In some embodiments, each radar transceiver IC 202, 204 performs the range FFT and the Doppler FFT for each radar frame.

The processing unit 206 includes functionality to process the data received from the radar transceiver ICs 202, 204 to complete any remaining signal processing to determine, for example, distance, velocity, and angle of any detected objects. The processing unit 206 may also include functionality to perform post processing of the information about the detected objects, such as tracking objects, determining rate and direction of movement, etc. The processing unit 206 may perform velocity determination as per an embodiment of methods for increasing the maximum measurable velocity described herein. The processing unit 206 may include any suitable processor or combination of processors as needed for the processing throughput of the application using the radar data. For example, the processing unit 206 may include a digital signal processor (DSP), a microcontroller (MCU), an SOC combining both DSP and MCU processing, or a floating point gate array (FPGA) and a DSP.

Referring now to FIG. 3, the radar transceiver IC 300 may include multiple transmit channels 304 for transmitting FMCW signals and multiple receive channels 302 for receiving the reflected transmitted signals. Any suitable number of receive channels and transmit channels may be used in embodiments. Further, the number of receive channels and the number of transmit channels may not be the same. For example, an embodiment of the radar transceiver IC 300 may have two transmit channels and four receive channels.

A transmit channel 304 includes a suitable transmitter coupled to a transmit antenna. Further, each of the transmit channels 304 are identical and include a power amplified (PA) 307, 309 coupled between a transmit antenna and the RFSYNTH 330 to amplify the transmitted signal. A receive channel 302 includes a suitable receiver coupled to a receive antenna. Further, each of the receive channels 302 are identical and include a low-noise amplifier (LNA) 303, 305 to amplify the received radio frequency (RF) signal, a mixer 306, 308 to mix the transmitted, i.e., local oscillator (LO), signal with the received RF signal to generate an intermediate frequency (IF) signal, a baseband bandpass filter 310, 312 for filtering the IF signal, a variable gain amplifier (VGA) 314, 316 for amplifying the filtered IF signal, and an analog-to-digital converter (ADC) 318, 320 for converting the analog IF signal to a digital IF signal. The bandpass filter, VGA, and ADC of a receive channel may be collectively referred to as the analog baseband, the baseband chain, the complex baseband, or the baseband filter chain. Further, the bandpass filter and VGA may be collectively referred to as an IF amplifier (IFA).

The receive channels 302 are coupled to the digital front end (DFE) component 322 to provide the digital IF signals to the DFE 322. The DFE 322, which may also be referred to as the digital baseband, may include functionality to perform decimation filtering on the digital IF signals to reduce the data transfer rate. The DFE 322 may also perform other operations on the digital IF signals, e.g., DC offset removal, digital compensation of non-idealities in the receive channels, such as inter-RX gain imbalance non-ideality, inter-RX phase imbalance non-ideality and the like. The DFE 322 is coupled to the signal processor component 344 to transfer the output of the DFE 322 to the signal processor component 344.

The signal processor component 344 is configured to perform a portion of the signal processing on the digital IF signals from a frame of chirps and to provide the results of this signal processing to the processing unit 206. In some embodiments, the results are provided to the processing unit 206 via the high speed serial interface 324. In some embodiments, the results are provided via the serial peripheral interface (SPI) 328. In some embodiments, the signal processor component 344 may perform the range FFT on each sequence of chirps in a radar frame. In some embodiments, the signal processor component 344 may also perform the Doppler FFT on the results of the range FFTs.

The signal processor component 344 may include any suitable processor or combination of processors. For example, the signal processor component 344 may be a digital signal processor, an MCU, an FFT engine, a DSP+MCU processor, a field programmable gate array (FPGA), or an application specific integrated circuit (ASIC). The signal processor component 344 is coupled to memory 348 to store intermediate results of the portion of the signal processing performed on the digital IF signals.

The on-chip memory component 348 provides on-chip storage, e.g., a computer readable medium, which may be used, for example, to communicate data between the various components of the IC 300, to store software programs executed by processors on the IC 300, etc. The on-chip memory component 348 may include any suitable combination of read-only memory and/or random access memory (RAM), e.g., static RAM. The direct memory access (DMA) component 346 is coupled to the memory component 348 to perform data transfers from the memory component 348 to the high speed interface 324 and/or the SPI 328.

The serial peripheral interface (SPI) 328 provides an interface for communication with the processing unit 206. For example, the processing unit 206 may use the SPI 328 to send control information, e.g., timing and frequencies of chirps, output power level, triggering of monitoring functions, etc., to the control module 326. The radar transceiver IC 300 may use the SPI 328, for example, to send test data to the processing unit 206.

The control module 326 includes functionality to control the operation of the radar transceiver IC 300. The control module 326 may include, for example, a microcontroller that executes firmware to control the operation of the radar transceiver IC 300.

The programmable timing engine 342 includes functionality to receive chirp parameter values for a sequence of chirps in a radar frame from the control module 326 and to generate chirp control signals that control the transmission and reception of the chirps in a frame based on the parameter values. The chirp parameters are defined by the radar system architecture and may include, for example, a transmitter enable parameter for indicating which transmitters to enable, a chirp frequency start value, a chirp frequency slope, an analog-to-digital (ADC) sampling time, a ramp end time, a transmitter start time, etc.

The radio frequency synthesizer (RFSYNTH) 330 includes functionality to generate signals for transmission based on chirp control signals from the timing engine 342. In some embodiments, the RFSYNTH 330 includes a phase locked loop (PLL) with a voltage controlled oscillator (VCO).

The multiplexor 332 is coupled to the RFSYNTH 330 and the input buffer 336. The multiplexor 332 is configurable to select between signals received in the input buffer 336 and signals generated by the RFSYNTH 330. The output buffer 338 is coupled to the multiplexor 332 and may be used, for example, to transmit signals selected by the multiplexor 332 to the input buffer of another radar transceiver IC. For example, the output buffer 338 of the master radar transceiver IC 202 is coupled to the input buffer 336 of the slave radar transceiver IC 204 to send signals from the RFSYNTH 330 of the master radar transceiver IC 202 to the slave radar transceiver IC 204. Further, the multiplexer 332 of the slave radar transceiver IC 204 is configured to select the signals received in the input buffer 336.

The clock multiplier 340 increases the frequency of the transmission signal (LO signal) to the LO frequency of the mixers 306, 308. The clean-up PLL (phase locked loop) 334 operates to increase the frequency of the signal of an external low frequency reference clock (not shown) to the frequency of the RFSYNTH 330 and to filter the reference clock phase noise out of the clock signal.

Figure 4:
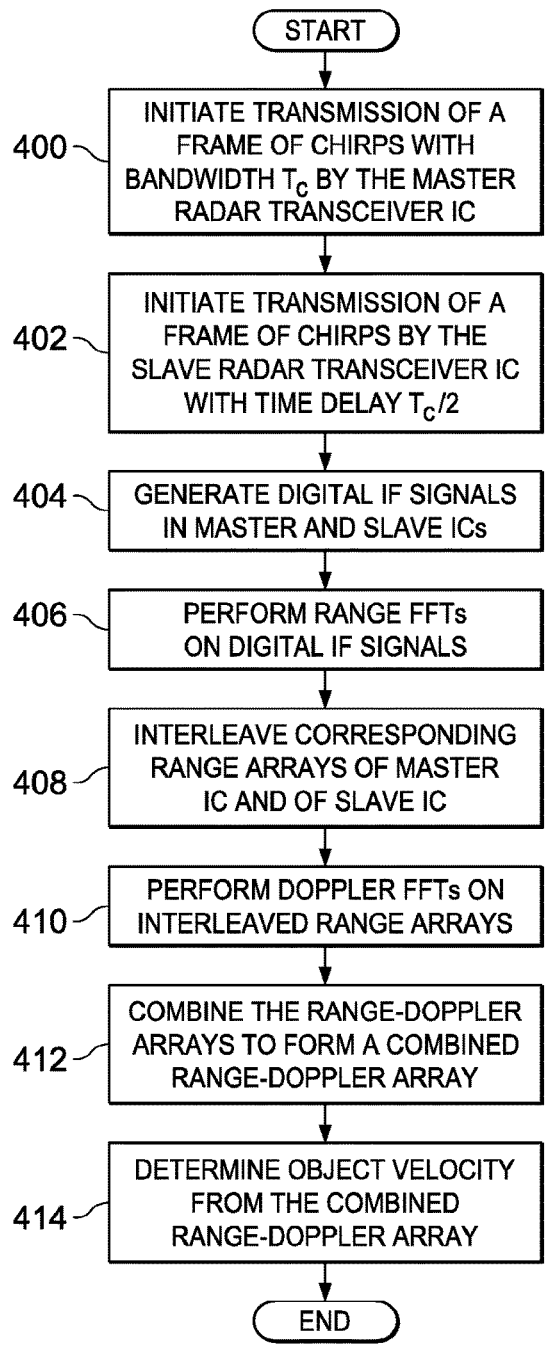
FIGS. 4 and 6 are flow diagrams of methods for increasing the maximum measurable velocity in a radar system.
Figure 6:
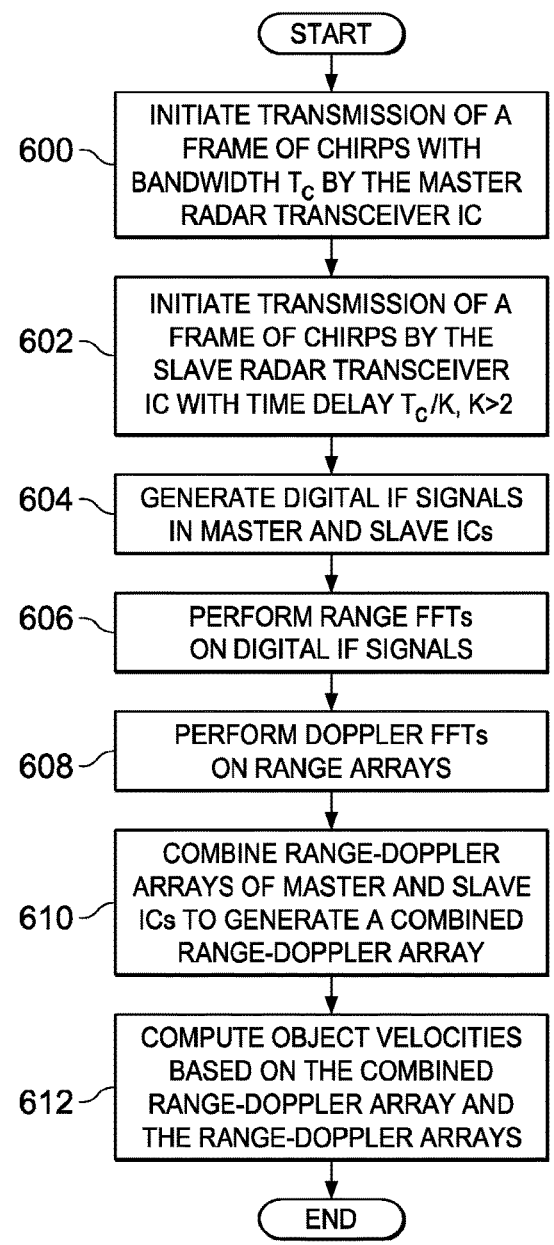

FIGS. 4 and 6 are flow diagrams of methods for increasing the maximum measurable velocity in a radar system such as that of FIGS. 2 and 3. As previously mentioned, the maximum measurable velocity $v_{max}$ of a radar system may be increased by staggering the transmissions of the master radar transceiver IC and the slave radar IC by a time delay $\Delta T$ where $\Delta T = T_c/K$, $K \geq 2$ and $T_c$ is the chirp periodicity. The method of FIG. 4 is for the symmetrical case where $K=2$ and the method of FIG. 6 is for the asymmetrical case where $K>2$. For simplicity of explanation, the methods are described in reference to the two IC architecture of FIGS. 2 and 3. Further, the method is explained assuming that each radar transceiver IC has four receive channels and two transmit channels. One of ordinary skill in the art will understand embodiments in which the radar transceiver ICs may have more or fewer receive channels and/or transmit channels.

Referring first to FIG. 4, the transmission of a frame of chirps with chirp periodicity $T_c$ is initiated 400 by the master radar transceiver IC 202. The transmission of a frame of chirps by the slave radar transceiver IC 204 is then initiated 402 with a time delay of $T_c/2$. As shown in FIG. 2, the master radar transceiver IC 202 and the slave radar transceiver IC 204 are connected by a synchronization (SYNC) signal line that is used to indicate to the slave IC 204 when the master IC 204 has started transmission. The slave IC 204 is programmed to initiate transmission with a delay of $T_c/2$ in response to the SYNC signal. Digital IF signals are generated 404 in each receive channel 302 of each of the radar transceiver ICs 202, 204 as the reflected chirps are received. Thus, four digital IF signals, one from each receive channel 302, are generated in each radar transceiver IC 202, 204.

Range FFTs are performed 406 on the digital IF signals to generate a range array for each digital IF signal. That is, four M×N range arrays from, each from a respective one of the four receive channels 302, are generated in each radar transceiver IC 202, 204, where M is the number of chirps in the chirp sequence and N is the number of time samples for receiving a chirp. In some embodiments, respective range FFTs are performed in the signal processor 344 of each radar transceiver IC 202, 204 and the resulting range arrays are communicated to the processing unit 206. In some embodiments, the digital IF signals are communicated to the processing unit 206, which performs the range FFTs.

Figure 5:
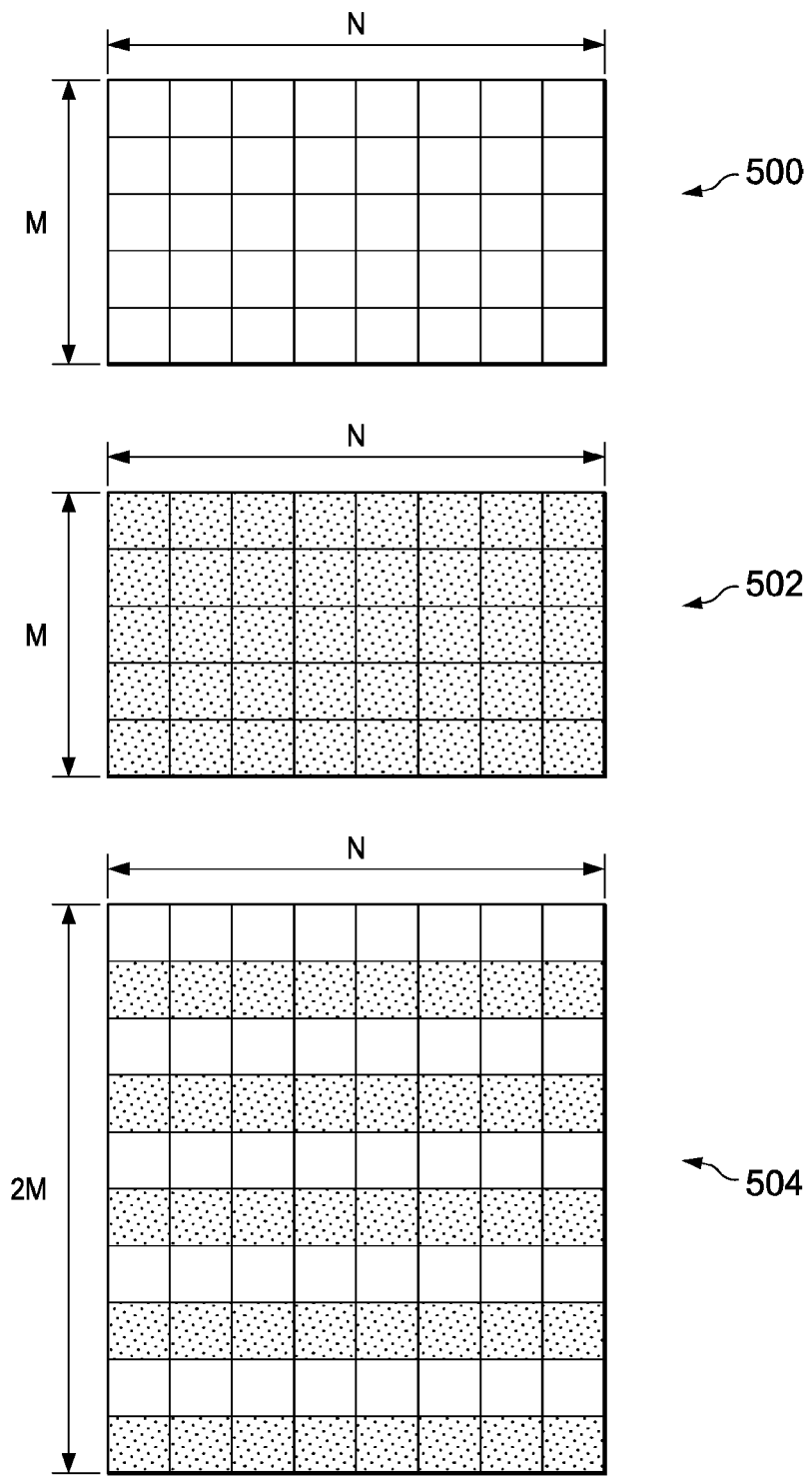
FIG. 5 is an example illustrating interleaving of range arrays.

The corresponding range arrays of the master radar transceiver IC 202 and the range arrays of the slave radar transceiver IC 204 are interleaved 408 row by row to generate four 2M×N range arrays. Correspondence of receive channels is explained below herein. That is, the rows of the range array resulting from a receive channel of the master radar transceiver IC 202 and the rows of the range array resulting from the corresponding receive channel of the slave radar transceiver IC 204 are interleaved to form a 2M×N interleaved range array. An example of the interleaving is shown in FIG. 5. In this example, a small M×N array 500 and a small M×N array 502 are interleaved to create the 2M×N interleaved range array 504. Note that the resulting interleaved range array is equivalent to a range array that would result from a single frame of chirps with an inter-chirp spacing of $T_c/2$, thus doubling $v_{max}$. The rows of the range arrays of the other corresponding receive channels are similarly interleaved.

Doppler FFTs are performed 410 on each interleaved range array to generate four range-Doppler arrays. That is, a Doppler FFT is performed on each of the N columns of each 2M×N interleaved range array. The four range-Doppler arrays are then combined 412 to form a combined range-Doppler array. The combining may be performed, for example, by non-coherently adding the corresponding elements of each of the four range-Doppler arrays. Non-coherent addition may involve performing a non-linear operation, e.g., squaring, on each of the range-Doppler arrays, and then performing an element by element addition of the resulting arrays to create a single combined range-Doppler array. Peaks in the resulting combined range-Doppler array are potential objects and the velocity of these potential objects may be determined 414 from the combined range-Doppler array. More specifically, the row and column number of a peak in the combined range-Doppler array respectively correspond to the range and the velocity of a potential object.

Referring now to FIG. 6, the transmission of a frame of chirps with chirp period $T_c$ is initiated 600 by the master radar transceiver IC 202. The transmission of a frame of chirps by the slave radar transceiver IC 204 is then initiated 602 with a time delay $T_c/K$, where $K>2$. As shown in FIG. 2, the master radar transceiver IC 202 and the slave radar transceiver IC 204 are connected by a synchronization (SYNC) signal line that is used to indicate to the slave IC 204 when the master IC 204 has started transmission. The slave IC 204 is programmed to initiate transmission with a delay of $T_c/K$ in response to the SYNC signal. Digital IF signals are generated 604 in each receive channel 302 of each of the radar transceiver ICs 202, 204 as the reflected chirps are received. Thus, four digital IF signals are generated in each radar transceiver IC 202, 204.

Range FFTs are performed 606 on the digital IF signals to generate a range array for each digital IF signal. That is, four M×N range arrays are generated where M is the number of chirps in the chirp sequence and N is the number of time samples for receiving a chirp. In some embodiments, respective range FFTs are performed in the signal processor 344 of each radar transceiver IC 202, 204 and the resulting range arrays are communicated to the processing unit 206. In some embodiments, the digital IF signals are communicated to the processing unit 206, which performs the range FFTs.

Doppler FFTs are then performed 608 on each of the range arrays to generate eight range-Doppler arrays. That is, a Doppler FFT is performed on each of the N columns of each M×N range array. In some embodiments, respective Doppler FFTs are performed in the signal processor 344 of each radar transceiver IC 202, 204 and the resulting range-Doppler arrays are communicated to the processing unit 206. In some embodiments, the respective Doppler FFTs are performed by the processing unit 206.

The four range-Doppler arrays of the master radar transceiver IC 202 and the four range-Doppler arrays of the slave radar transceiver IC 204 are then combined 610 to generate a combined range-Doppler array. The combining may be performed, for example, by non-coherently adding the corresponding elements of each of the eight range-Doppler arrays. Non-coherent addition is previously described herein. Peaks in the resulting combined range-Doppler array are potential objects and the velocities of the potential objects are determined 612 based on the combined range-Doppler array and the eight range-Doppler arrays. The velocity of an object may be determined as per the method of FIG. 7.

As shown in the flow diagram of FIG. 7, initially a velocity estimate for the object is computed 700 based on the combined range-Doppler array. This velocity estimate, referred to as $v_{est1}$ herein, may be determined from the location of the peak in the combined range-Doppler array corresponding to the object. As previously mentioned, the column number of a peak in the combined range-Doppler array corresponds to the velocity of a potential object. Note that this velocity estimate may be aliased, i.e., there may be phase rollover such that the error in the estimated velocity $v_{est1}$ is an integer multiple of the maximum measurable velocity $v_{max}$.

More specifically, the relative motion of an object with respect to the radar system induces a phase change $\phi_d$ in the received signal across subsequent chirps in a frame where the phase change is given by $$\phi_d = \frac{4\pi v T_c}{\lambda} \qquad \text{Eq. 1}$$

where v is the velocity of the object, Tc is the chirp periodicity, and $\lambda$ is the wavelength corresponding to the starting frequency of a chirp. Because there is a linear progression in the phase across chirps in a frame, the phase change $\phi_d$ can be estimated using an FFT. Once the phase change $\phi_d$ is estimated, the velocity estimate $v_{est1}$ can be estimated by inverting Eq. 1, i.e., $$v_{est1} = \frac{\lambda \phi_d}{4\pi T_c}. \qquad \text{Eq. 2}$$

Another velocity estimate is also computed 702 for the object based on phase differences of the object peak in corresponding range-Doppler arrays. This velocity estimate, referred to as $v_{est2}$ herein, may be computed based on the phase differences of the object peak in the range-Doppler arrays resulting from corresponding receive channels in the master radar transceiver IC 202 and the slave radar transceiver IC 204. Correspondence of receive channels is explained below herein. More specifically, for each corresponding pair of receive channels, the difference between the phase of the peak in the range-Doppler array resulting from the receive channel of the master radar transceiver IC 202 and the phase of the peak in the range-Doppler array resulting from the corresponding receive channel of the slave radar transceiver IC 204 is computed, e.g., one phase value is subtracted from the other. The velocity estimate $v_{est2}$ may be computed as per $$v_{est2} = \frac{\Delta\phi K}{\pi} v_{max} \qquad \text{Eq. 3}$$

where $\Delta\varphi$ is the average of the four phase differences, and $$v_{max} = \frac{\lambda}{4 T_c}$$

where $\lambda$ is me wavelength of the signal when transmission is initiated.

The derivation of Eq. 3 is as follows. Because the phase change $\phi_d$ can only be estimated between $(-\pi, \pi)$, the maximum velocity $v_{max}$ that can be measured is given by is given by $$v_{max} = \lambda/(4-T_c), \qquad \text{Eq. 4}$$

which is obtained by plugging $\phi_d = \pi$ in Eq. 2. Note that Eq. 2 is true only if the absolute value of $\phi_d < \pi$. In general, the phase change $\phi_d$ may be aliased and hence the true velocity $v_{true}$ is given by $$v_{true} = \frac{\lambda(\phi_d + 2n\pi)}{4\pi T_c} = \frac{\lambda \phi_d}{4\pi T_c} + \frac{\lambda 2n}{4 T_c} + v_{est1} + 2n v_{max} \qquad \text{Eq. 5}$$

by substitution from Eq. 2 and Eq. 4.

Now assume that the phase of a peak across two range-Doppler arrays differs by $\Delta\phi$. It can be shown that $$\Delta\phi = \frac{4\pi v \Delta T}{\lambda}.$$

This is analogous to Eq. 1 with $T_c$ replaced by $\Delta T$. Hence, a second estimate of the velocity $v_{est2}$ may be computed as given by $$v_{est2} = \frac{\Delta\phi \lambda}{4\pi \Delta T} = \frac{\Delta\phi K}{\pi} v_{max} \qquad \text{Eq. 6}$$

using $K = \Delta T / T_c$ and $v_{max}$ from Eq. 4.

The velocity of the object is then computed 704 based on the two estimated velocities $v_{est1}$ and $v_{est2}$. The velocity, referred to as $v_{true}$ herein, may be computed as per Eq. 5, i.e., $$v_{true} = v_{est1} + 2n v_{max}$$

where n is an integer that estimates the ambiguity. The assumption is that $v_{est2}$ is essentially unaliased though noisy, i.e., $v_{est2} = v_{true} + $ noise. Comparing Eq. 5 and Eq. 6, and noting that $v_{est1}$ is also a noisy estimate of $v_{true}$, the ambiguity n can be estimated as given by $$n_{est} = (v_{est2} - v_{est1})/2 v_{max}$$

where $n_{est}$ is rounded to the nearest integer to obtain the value of n. The value of n is applied in Eq. 5 to estimate the true velocity $v_{true}$.

The relative placement of the transmit and receive antennas affects the phase of the signal. Thus, for the above described methods, it is important that the phase affects each radar transceiver IC in an identical fashion. In some embodiments, the outputs of transmit channels in each IC are routed to respective transmit antennas and the signals received on shared receive antennas are routed to respective receive channels on both ICs. More specifically, assume there are two transmit channels in each radar transceiver IC. The output of one transmit channel on the master IC and the output of one transmit channel on the slave IC are both routed to a shared single transmit antenna. The outputs of the other transmit channels on the two ICs are similarly routed to another shared single transmit channel. A transmit channel of the master radar transceiver IC and a transmit channel of the slave radar transmitter IC coupled to the same transmit antenna may be referred to as corresponding transmit channels herein.

Further, assume there are four receive channels in each radar transceiver IC. One receive channel on the master IC and one receive channel on the slave IC are coupled to a shared single receive antenna to receive signals. The other receive channels on the ICs are similarly paired and coupled to respective shared receive antennas to receive signals. A receive channel of the master radar transceiver IC and a receive channel of the slave radar transmitter IC coupled to the same receive antenna may be referred to as corresponding receive channels herein.

FIG. 8 is a simple example illustrating the above antenna routing between two radar transceiver ICs 800, 802, each having one transmit channel and four receive channels. The transmit channel on the radar transceiver IC 800 and the transmit channel on the radar transceiver IC 802 are coupled to the single shared transmit antenna 804. For simplicity, the coupling to only one receive antenna 806 is shown. A receive channel in the IC 800 and a receive channel in the IC 802 are coupled to the shared receive antenna 806. The other receive antennas are similarly coupled to respective receive channels in the IC 800 and the IC 802.

The interconnection of the antennas as described requires combining the signals from transmit channels of multiple radar transceiver ICs to the same transmit antenna and splitting the signals from the receive antennas to receive channels of multiple ICs. Placing such splitters/combiners at high frequency, e.g., 77 GHz, can result in losses. The use of splitters and combiners can be avoided by having each IC use a different set of antennas. However, in such an arrangement, ensuring that the phase relationships between corresponding transmit and receive antennas remain the same across ICs is important. In some embodiments, this is achieved using the principle of antenna equivalence.

Figure 9:
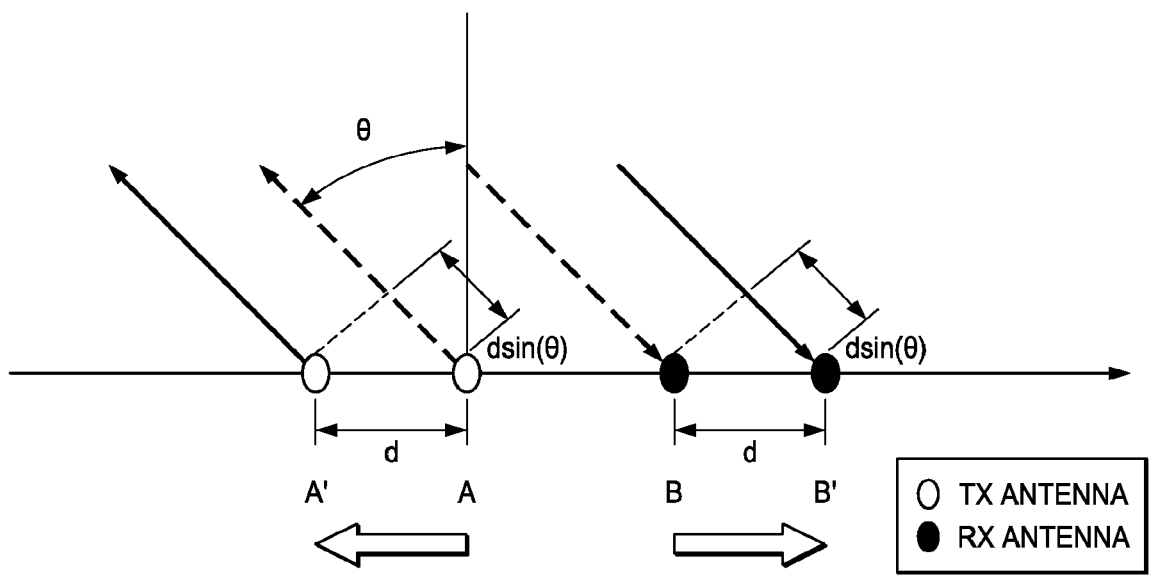
FIG. 9 is an example illustrating the principle of antenna equivalence.

A transmit/receive (TX-RX) antenna pair is defined by the total distance traversed by the RF signal from the transmit antenna to the object and back from the object to the receive antenna. Thus, any two TX-RX antenna pairs are equivalent as long as the distance TX→object→RX is the same for both. Consider the TX-RX antenna pairs A'-B' and A-B shown in FIG. 9. Rays emanating from the TX antennas A and A' toward an object located at an angle θ are depicted. In addition, reflected rays from the object received by the RX antennas B and B' are shown. The distance of the object from the TX and RX antennas is assumed to be much larger than the inter-antenna distances thus making the rays from A and A' and to B and B' parallel.

The TX antenna A' is at a distance d to the left of the TX antenna A. Thus, the TX antenna A' is closer to the object by an amount d sin(θ). Similarly, the RX antenna B' is at a distance of d to the right of the RX antenna B. Thus, the RX antenna B' is farther from the object by an amount d sin(θ). The total distance from A→object→B is the same as the total distance from A'→object→B', thus the antenna pairs A-B and A'-B' are equivalent. More generally, two TX-RX antenna pairs are equivalent as long as the mid-points of the line connecting each of the TX-RX pairs are the same. The receive channels coupled to the receive antennas in equivalent TX-RX antenna pairs may be referred to as corresponding receive channels herein.

Figure 10:
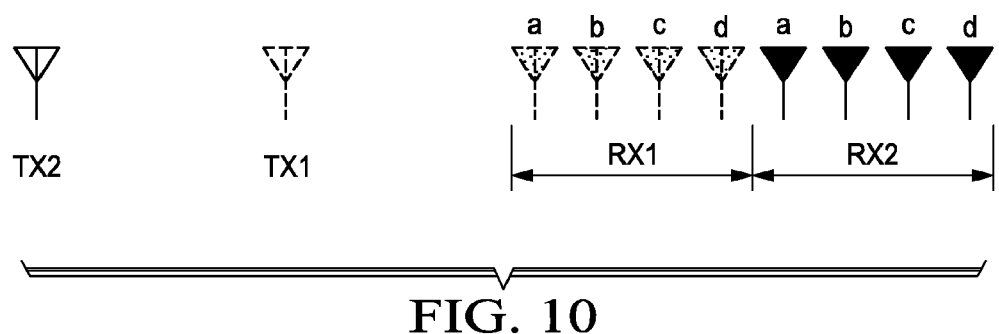
FIG. 10 is an example antenna configuration designed using the principle of antenna equivalence.

FIG. 10 shows an example antenna configuration designed using the principle of antenna equivalence. In this example, one radar transceiver IC (not shown) is coupled to four receive antennas referred to collectively as RX1 and a single transmit antenna TX1. Another radar transceiver IC (not shown) is also coupled to four receive antennas referred to collectively as RX2 and a single transmit antenna TX2. TX1 and RX1 and TX2 and RX2 are connected to TX/RX channels of the respective ICs. In this example, the distance between TX1 and TX2 is four times the equivalent distances between consecutive RX antennas in RX1 and RX2. Thus, the TX1→RX1 antenna a pair is equivalent to TX2→RX2 antenna a pair, the TX1→RX1 antenna b pair is equivalent to TX2→RX2 antenna b pair, etc. The principle of antenna equivalence ensures that such a configuration has the same behavior as the example configuration of FIG. 8.

In some embodiments, a common antenna-array architecture operable in two modes is used. One mode favors a higher angle resolution and the other favors a higher maximum measurable velocity. An example embodiment is explained in reference to the example of FIG. 10. When higher angle resolution is preferred, only one transmit antenna is operational, e.g., TX1, and the associated transmit channel is operational while TX2 and the associated transmit channel are not used. When a frame of chirps is transmitted by TX1, the reflected chirps are received by all eight receive antennas of RX1 and RX2. Compared to a radar system with a single radar transceiver IC, this configuration may provide up to a 2×improvement in angle resolution. However, the maximum measurable velocity is identical to that of a radar system with a single radar transceiver IC.

When a higher maximum measurable velocity is preferred, both TX1 and TX2 transmit frames of chirps in accordance with a method described herein. The reflected chirps from the TX1 transmission are received in the RX1 antennas and the reflected chirps from the TX2 transmission are received in the RX2 antennas. Note that the staggered timing of the chirp transmission guarantees non-interference. That is, each IC independently processes the reflected chirps from the frames transmitted by the IC without any interference from signals from the other IC. The frequency of the IF signal depends on the delay between the TX and RX signals. A small separation in time in the transmitted signals of the two ICs ensures that any signals from the one IC received in the RX channels of the other IC will generate an IF signal that is outside the IF bandwidth of the other IC, thus ensuring non-interference. The signals are processed as per the method to achieve a higher maximum measurable velocity. In this mode of operation, the maximum measurable velocity is increased by a factor of K as previously described herein as compared to a radar system with a single radar transceiver IC. However, the angle resolution will be the same as that of a radar system with a single radar transceiver IC.

Any suitable technique for mode switching may be used, e.g., switching the mode for each frame of chirps. The implementation of the switching logic may be performed, for example, by the external processor of the radar system.

Routing mismatches, e.g., differences in the lengths of the connections from the antennas to the radar transceiver ICs, and parametric variations between ICs may cause systematic phase offsets between corresponding receive channels in the two ICs. In some embodiments, calibration is performed based on stationary objects in the scene to determine the phase offsets. For stationary objects, there should be no phase change across chirps in the absence of a systematic phase offset.

Figure 11:
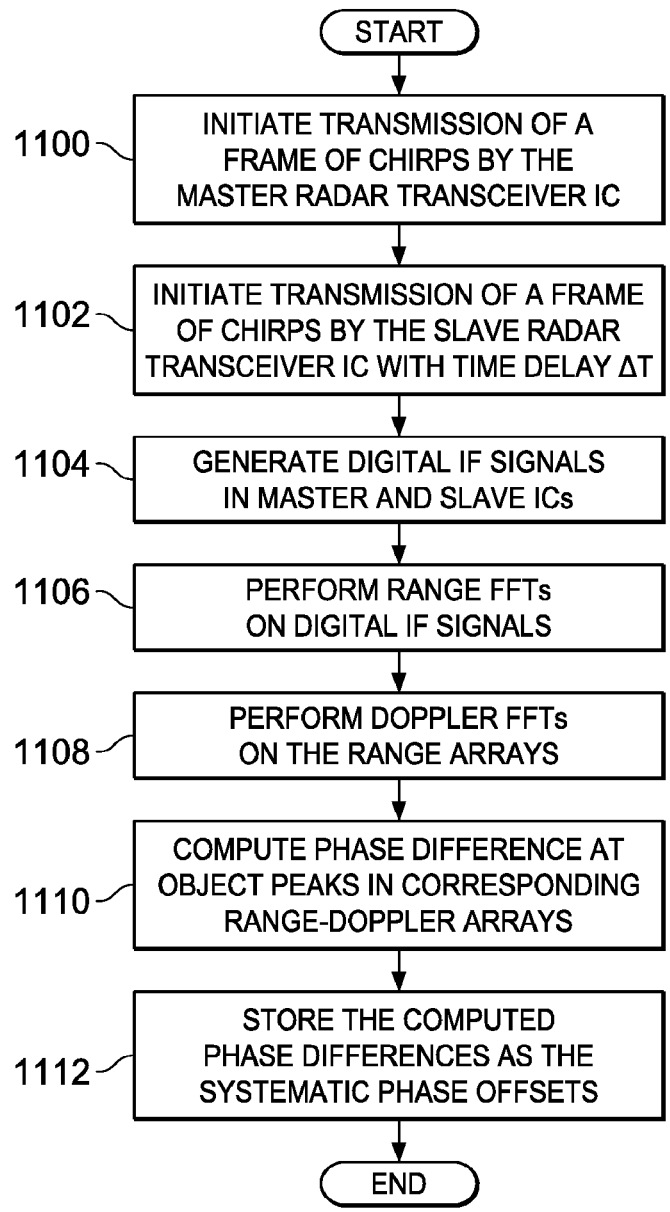
FIGS. 11 and 12 are flow diagrams of methods for determining systemic phase offsets.

An initial calibration to determine the systematic phase offsets may be performed, e.g., in a factory, using a known stationary object. FIG. 11 is a flow diagram of a method for determining the systematic phase offsets using a known stationary object that may be performed in a radar system such as that of FIGS. 2 and 3. The method may be performed when the radar system is operated in a calibration mode. The method is explained assuming that each radar transceiver IC has four receive channels and two transmit channels. One of ordinary skill in the art will understand embodiments in which the radar transceiver ICs may have more or fewer receive channels and/or transmit channels.

The calibration process begins with the transmission of a frame of chirps initiated 1100 by the master radar transceiver IC 202. The transmission of a frame of chirps by the slave radar transceiver IC 204 is then initiated 1102 with a time delay of $\Delta T$. Any suitable value of $\Delta T$ may be used that does not cause interference between the ICs 202, 204, and minimizes error in the calculation of the systematic phase offsets. In general, a suitable value may be on the order of a few microseconds, e.g., between 10 and 100 us. Digital IF signals are generated 1104 in each receive channel 202 of each of the radar transceiver ICs 202, 204 as the reflected chirps from the object are received. Thus, four digital IF signals, one from each receive channel 202, are generated in each radar transceiver IC 202, 204.

Range FFTs are performed 1106 on the digital IF signals to generate a range array for each digital IF signal. Doppler FFTs are then performed 1108 on each of the range arrays to generate eight range-Doppler arrays. For each corresponding pair of receive channels, the difference between the phase of the object peak in the range-Doppler array resulting from the receive channel of the master radar transceiver IC 202 and the phase of the object peak in the range-Doppler array resulting from the corresponding receive channel of the slave radar transceiver IC 204 is computed 1110, e.g., one phase value is subtracted from the other. A search in each of the range-Doppler arrays may need to be performed to locate the object peak. Because the stationary object is known, the approximate location of a peak or peaks corresponding to the object may be known. Thus, the search can performed in the approximate area of each of the range-Doppler arrays to locate the peak. Further, if the object is large, there may be many peaks corresponding to the object. If there are multiple peaks, any of the peaks may be used.

The computed phase difference for a corresponding pair of receive channels is the systematic phase offset for the receive channel pair. The four systematic phase offsets are stored 1112 for use in the velocity computations performed during normal operation of the radar system 200.

As part of the velocity computation for an object, the systematic phase offsets may be used in the computation of $v_{est2}$ as described in reference to the method of FIG. 7. More specifically, in step 702, the systematic phase offset for a receive channel pair is subtracted from the phase difference computed for the receive channel pair prior to computing the average of the four phase differences. The systematic phase offsets may also be used as part of the velocity computation for an object as described in reference to the method of FIG. 4. More specifically, the systematic phase offsets may be applied to corresponding range arrays generated in step 406 prior to interleaving the range arrays in step 408.

Figure 12:
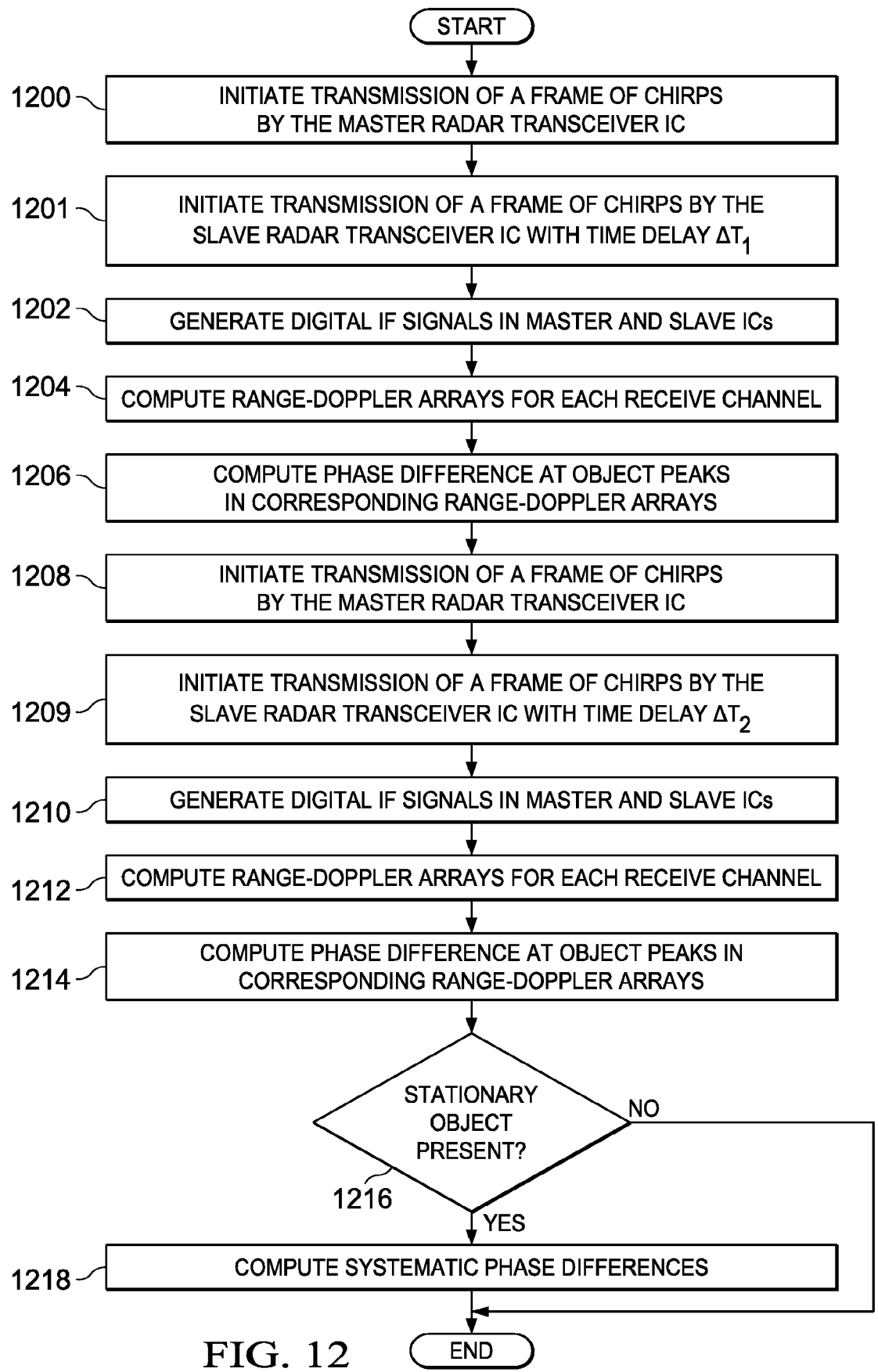

In some embodiments, calibration may also be performed to update the systematic phase offsets while the radar system 200 is operational if a stationary object can be identified in the FOV of the radar. FIG. 12 is a flow diagram of a method for determining the systematic phase offsets using an identified stationary object that may be performed in a radar system such as that of FIGS. 2 and 3. The method may be performed when the radar system is operated in a calibration mode. Further, the method may be performed periodically, on command, and/or when the radar system is initialized. The method is explained assuming that each radar transceiver IC has four receive channels and two transmit channels. One of ordinary skill in the art will understand embodiments in which the radar transceiver ICs may have more or fewer receive channels and/or transmit channels.

The calibration process begins with the transmission of a frame of chirps initiated 1200 by the master radar transceiver IC 202. The transmission of a frame of chirps by the slave radar transceiver IC 204 is then initiated 1201 with a time delay of $\Delta T_1$. Any suitable value of $\Delta T_1$ may be used. Suitable values for time delays used during calibration are previously described in reference to FIG. 11. Digital IF signals are generated 1202 in each receive channel 202 of each of the radar transceiver ICs 202, 204 as the reflected chirps are received. Thus, four digital IF signals, one from each receive channel 202, are generated in each radar transceiver IC 202, 204.

Range-Doppler arrays are then computed 1204 for each receive channel. When the range-Doppler arrays are available, phase differences of object peaks are computed 1206. That is, for each corresponding pair of receive channels, the difference between the phase of an object peak in the range-Doppler array resulting from the receive channel of the master radar transceiver IC 202 and the phase of the object peak in the range-Doppler array resulting from the corresponding receive channel of the slave radar transceiver IC 204 is computed, e.g., one phase value is subtracted from the other. Thus, four phase differences are computed for each object peak.

The transmission of a frame of chirps is then initiated 1208 by the master radar transceiver IC 202. The transmission of a frame of chirps by the slave radar transceiver IC 204 is also initiated 1209 with a time delay of $\Delta T_2$. Any suitable value of $\Delta T_2$ may be used with the caveat that if the values of $\Delta T_1$ and $\Delta T_2$ are too close, the determination of whether or not an object is stationary may be prone to error. Examples of suitable values of $\Delta T_1$ and $\Delta T_2$ are 20 us and 40 us, respectively. Digital IF signals are generated 1210 in each receive channel 202 of each of the radar transceiver ICs 202, 204 as the reflected chirps are received. Thus, four digital IF signals, one from each receive channel 202, are generated in each radar transceiver IC 202, 204.

Range-Doppler arrays are then computed 1212 for each receive channel. When the range-Doppler arrays are available, phase differences of object peaks are computed 1214. That is, for each corresponding pair of receive channels, the difference between the phase of a object peak in the range-Doppler array resulting from the receive channel of the master radar transceiver IC 202 and the phase of the object peak in the range-Doppler array resulting from the corresponding receive channel of the slave radar transceiver IC 204 is computed, e.g., one phase value is subtracted from the other. Thus, four phase differences are computed for each object peak.

A determination 1216 is then made as to whether or not a stationary object is present in the scene based on the two sets of object peak phase differences. That is, for an object peak appearing in both of the range-Doppler arrays, the difference between each phase difference of the four phase differences determined for the peak using time delay $\Delta T_1$ and the respective phase difference of the four phase differences determined for the peak using time delay $\Delta T_2$ is compared to a threshold determined by the signal-to-noise ratio. If each of the four differences is less than the threshold, then the peak corresponds to a stationary object. Object peaks may be searched until a peak corresponding to a stationary object is found or all object peaks have been considered. If no stationary object is present 1216, the method terminates.

If a peak corresponding to a stationary object is found 1216, then the systematic phase offsets are computed based on the four phase differences determined for the peak using time delay $\Delta T_1$ and the four phase differences determined for the peak using time delay $\Delta T_2$. More specifically, corresponding phase differences are averaged to determine the four systematic phase offsets, one for each corresponding pair of receive channels. The four systematic phase offsets are stored for use in the velocity computations performed during normal operation of the radar system 200. Use of the systematic phase offsets in the method of FIG. 7 and the method of FIG. 4 is previously described herein.

In some embodiments, if multiple object peaks correspond to the stationary object, systematic phase offsets are also determined for these peaks. In such embodiments, the final four systematic phase offsets are determined by averaging corresponding systematic phase offsets of all the peaks.

OTHER EMBODIMENTS

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in a radar system includes two radar transceiver ICs. One of ordinary skill in the art will understand embodiments using symmetric staggering in which a radar system includes more than two transceiver ICs. In general, if there are N radar transceiver ICs in a radar system, the transmission of a frame of chirps from each transceiver IC is staggered by Tc/N from the previous one, thus ensuring that the transmitted chirps are equispaced with respect to the chirps of the immediate neighboring ICs.

In another example, embodiments have been described herein assuming N time samples in a chirp and that N range results each corresponding to a specific range bin are stored for the chirp. One of ordinary skill in the art will understand embodiments in which a range FFT is performed on N time samples in a chirp to create $N_1 > N$ range results using for example, a zero padded FFT. Similarly, one of ordinary skill in the art will understand that a Doppler FFT may be performed over M range bins corresponding to M frames to create $M_1 > M$ range-Doppler results.

In another example, embodiments have been described herein in which the radar transceiver ICs in the front end of the radar system have a master slave relationship. One of ordinary skill in the art will understand embodiments in which the radar transceiver ICs do not have a master slave relationship, e.g., an external PLL is used to provide signals to all of the transceiver ICs.

In another example, embodiments employing the idea of antenna equivalence have been describe herein assuming one transmit antenna per radar transceiver IC. One of ordinary skill in the art will understand embodiments in which more than one transmit antenna is used. One of ordinary skill in the art will also understand embodiments having more or fewer receive antennas.

In another example, embodiments have been described herein in which specific parts of the radar signal processing are performed in the radar transceiver ICs and the remaining signal processing is performed by a processing unit receiving results from the radar transceiver ICs. One of ordinary skill in the art will understand embodiments in which the distribution of the signal processing between the radar transceiver ICs and the processing unit differs from the examples described herein.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in radar systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A radar system comprising:
a first radar transceiver integrated circuit (IC) configured to:
transmit a first frame of chirps at a first time, the first frame of chirps including a first chirp and a second chirp; and
generate a first digital signal in response to receiving a reflection of the first frame of chirps;
a second radar transceiver IC configured to:
transmit a second frame of chirps at a second time, wherein the second time is based on an elapsed time from a start of the first chirp in the first frame of chirps and the second chirp in the first frame of chirps; and
generate a second digital signal in response to receiving a reflection of the second frame of chirps; and
a processor coupled to the first radar transceiver IC and the second radar transceiver IC, the processor configured to determine an angle of arrival of an object based on the first digital signal and the second digital signal.

2. The radar system of claim 1, wherein the processor is further configured to:
perform range fast Fourier transforms (FFTs) on each digital signal to generate a range array for each digital signal;
interleave corresponding range arrays of the first digital signal and the second digital signal to generate interleaved range arrays;
perform Doppler FFTs on each interleaved range array to generate a range-Doppler array for each range array; and
combine the range-Doppler arrays to form a combined range-Doppler array, wherein the processor is configured to determine the angle of arrival of the object using the combined range-Doppler array.

3. The radar system of claim 1, wherein the processor is further configured to:
perform range fast Fourier transforms (FFTs) on each digital signal to generate a range array for each digital signal;
perform Doppler FFTs on each range array to generate a range-Doppler array for each digital signal; and
combine the range-Doppler arrays to generate a combined range-Doppler array,
wherein the processor is configured to determine the angle of arrival of the object based on the combined range-Doppler array and the range-Doppler arrays.

4. The radar system of claim 3, wherein to determine the angle of arrival of the object, the processor is further configured to:
compute a first angle of arrival estimate for the object based on the combined range-Doppler array;
compute a second angle of arrival estimate for the object based on phase differences of a peak corresponding to the object in corresponding range-Doppler arrays of the first digital signal and the second digital signal; and
compute the angle of arrival of the object based on the first angle of arrival estimate and the second angle of arrival estimate.

5. The radar system of claim 1, wherein the first radar transceiver IC is coupled to a first transmit antenna and a first receive antenna and the second radar transceiver IC is coupled to a second transmit antenna and a second receive antenna.

6. The radar system of claim 1, wherein the processor is further configured to operate in a calibration mode to determine systematic phase offsets between corresponding receive channels of the first radar transceiver IC and the second radar transceiver IC, wherein the systematic phase offsets are used in determining the angle of arrival of the object.

7. The radar system of claim 6, wherein to determine a systematic phase offset, the processor is further configured to
find a first peak corresponding to a known stationary object in a first range-Doppler array generated responsive to receiving first reflected chirps of a first test frame of chirps in a first receive channel of the first radar transceiver IC;
find a second peak corresponding to the first peak in a second range-Doppler array generated responsive to receiving second reflected chirps of a second test frame of chirps in a receive channel corresponding to the first receive channel of the second radar transceiver IC, the second test frame transmitted at a time delay from transmission of the first frame; and
determine the systematic phase offset based on a difference between a phase at the first peak and a phase at the second peak.

8. The radar system of claim 6 wherein to determine a systematic phase offset, the processor is further configured to
identify a stationary object in a field of view of the radar system, wherein to identify the stationary object, the radar system is configured to:
find a first peak corresponding to the object in a first range-Doppler array generated responsive to receiving first reflected chirps of a first test frame of chirps in a first receive channel of the first radar transceiver IC;
find a second peak corresponding to the first peak in a second range-Doppler array generated responsive to receiving second reflected chirps of a second test frame of chirps in a receive channel corresponding to the first receive channel of the second radar transceiver IC, the second test frame transmitted at a first time delay from transmission of the first test frame;
find a third peak corresponding to the object in a third range-Doppler array generated responsive to receiving third reflected chirps of a third test frame of chirps in the first receive channel of the first radar transceiver IC;
find a fourth peak corresponding to the third peak in a fourth range-Doppler array generated responsive to receiving fourth reflected chirps of a fourth test frame of chirps in the receive channel corresponding to the first receive channel of the second radar transceiver IC, the fourth test frame transmitted at a second time delay from transmission of the third test frame; and
determine that the object is stationary when a first phase difference at the first peak and the second peak is sufficiently similar to a second phase difference at the third peak and the fourth peak; and
determine the systematic phase offset based on the first phase difference and the second phase difference.

9. A method comprising:
initiating transmission of a first frame of chirps at a first time by a first radar transceiver integrated circuit (IC), the first frame of chirps including a first chirp and a second chirp;
initiating transmission of a second frame of chirps by a second radar transceiver IC at a second time, wherein the second time is based on an elapsed time from a start of the first chirp in the first frame of chirps and a start of the second chirp in the first frame of chirps;
generating a first digital signal by the first radar transceiver IC in response to receiving reflected chirps of the first frame of chirps;
generating a second digital signal by the second radar transceiver IC in response to receiving reflected chirps of the second frame of chirps; and
determining an angle of arrival of an object based on the first digital signal and the second digital signal.

10. The method of claim 9, further comprises:
performing range fast Fourier transforms (FFTs) on each digital signal to generate a range array for each digital signal;
interleaving corresponding range arrays of the first digital signal and the second digital signal to generate interleaved range arrays;
performing Doppler FFTs on each interleaved range array to generate a range-Doppler array for each range array; and
combining the range-Doppler arrays to form a combined range-Doppler array; and
determining the angle of arrival of the object using the combined range-Doppler array.

11. The method of claim 9, further comprises:
performing range fast Fourier transforms (FFTs) on each digital signal to generate a range array for each digital signal;
performing Doppler FFTs on each range array to generate a range-Doppler array for each digital signal; and combining the range-Doppler arrays to generate a combined range-Doppler array; and determining the angle of arrival of the object based on the combined range-Doppler array and the range-Doppler arrays.

12. The method of claim 11, wherein determining the angle of arrival further comprises:
computing a first angle of arrival estimate for the object based on the combined range-Doppler array;
computing a second angle of arrival estimate for the object based on phase differences of a peak corresponding to the object in corresponding range-Doppler arrays of the first digital signal and the second digital signal; and
computing the angle of arrival of the object based on the first angle of arrival estimate and the second angle of arrival estimate.

13. The method of claim 9, wherein the first radar transceiver IC is coupled to a first transmit antenna and a first receive antenna and the second radar transceiver IC is coupled to a second transmit antenna and a second receive antenna.

14. The method of claim 9, wherein determining the angle of arrival further comprises using systematic phase offsets between corresponding receive channels of the first radar transceiver IC and the second radar transceiver IC in determining the angle of arrival of the object.

15. The method of claim 14, further comprising determining a systematic phase offset while operating in a calibration mode by:
finding a first peak corresponding to a known stationary object in a first range-Doppler array generated responsive to receiving first reflected chirps of a first test frame of chirps in a first receive channel of the first radar transceiver IC;
finding a second peak corresponding to the first peak in a second range-Doppler array generated responsive to receiving second reflected chirps of a second test frame of chirps in a receive channel corresponding to the first receive channel of the second radar transceiver IC, the second test frame transmitted at a time delay from the transmission of the first frame; and
determining the systematic phase offset based on a difference between a phase at the first peak and a phase at the second peak.

16. The method of claim 14, wherein the radar system determines a systematic phase offset when operated in a calibration mode by:
identifying a stationary object in a field of view of the radar system by:
finding a first peak corresponding to the object in a first range-Doppler array generated responsive to receiving first reflected chirps of a first test frame of chirps in a first receive channel of the first radar transceiver IC;
finding a second peak corresponding to the first peak in a second range-Doppler array generated responsive to receiving second reflected chirps of a second test frame of chirps in a receive channel corresponding to the first receive channel of the second radar transceiver IC, the second test frame transmitted at a first time delay from transmission of the first test frame;
finding a third peak corresponding to the object in a third range-Doppler array generated responsive to receiving third reflected chirps of a third test frame of chirps in the first receive channel of the first radar transceiver IC;
finding a fourth peak corresponding to the third peak in a fourth range-Doppler array generated responsive to receiving fourth reflected chirps of a fourth test frame of chirps in the receive channel corresponding to the first receive channel of the second radar transceiver IC, the fourth test frame transmitted at a second time delay from transmission of the third test frame; and
determining that the object is stationary when a first phase difference at the first peak and the second peak is sufficiently similar to a second phase difference at the third peak and the fourth peak; and
determining the systematic phase offset based on the first phase difference and the second phase difference.

* * * * *